United States Patent
Han et al.

(10) Patent No.: US 7,467,313 B2
(45) Date of Patent: Dec. 16, 2008

(54) METHOD FOR TRANSMITTING A POWER-SAVING COMMAND BETWEEN A COMPUTER SYSTEM AND PERIPHERAL SYSTEM CHIPS

(75) Inventors: Chih-Cheng Han, Taipei (TW); Ming-Jiun Chang, Taipei (TW); Hsuan-Ching Chao, Taipei (TW); Chung-Hong Lai, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 405 days.

(21) Appl. No.: 11/315,171

(22) Filed: Dec. 23, 2005

(65) Prior Publication Data

US 2006/0212734 A1 Sep. 21, 2006

(30) Foreign Application Priority Data

Mar. 15, 2005 (TW) .............................. 94107918 A

(51) Int. Cl.
*G06F 1/32* (2006.01)
(52) U.S. Cl. ..................... 713/320; 713/300; 713/310; 713/323
(58) Field of Classification Search ................ 713/300, 713/320; 710/107
See application file for complete search history.

(56) References Cited

U.S. PATENT DOCUMENTS

| | | | | |
|---|---|---|---|---|
| 6,065,122 A | * | 5/2000 | Wunderlich et al. | 713/320 |
| 6,085,330 A | * | 7/2000 | Hewitt et al. | 713/322 |
| 6,199,134 B1 | * | 3/2001 | Deschepper et al. | 710/311 |
| 6,357,013 B1 | * | 3/2002 | Kelly et al. | 713/324 |
| 6,360,327 B1 | * | 3/2002 | Hobson | 713/300 |
| 7,017,054 B2 | * | 3/2006 | Schuckle et al. | 713/300 |
| 7,159,046 B2 | * | 1/2007 | Mulla et al. | 710/9 |
| 7,206,883 B2 | * | 4/2007 | Ho et al. | 710/260 |
| 7,234,050 B2 | | 6/2007 | Agan et al. | |
| 7,315,953 B2 | * | 1/2008 | Su et al. | 713/320 |
| 7,330,926 B2 | * | 2/2008 | Ho | 710/311 |
| 2003/0167413 A1 | * | 9/2003 | Stachura et al. | 713/300 |
| 2005/0039063 A1 | * | 2/2005 | Hsu et al. | 713/324 |

* cited by examiner

*Primary Examiner*—Nitin C Patel
(74) *Attorney, Agent, or Firm*—Patterson & Sheridan LLP

(57) ABSTRACT

A method for transmitting a power-saving command between a computer system and system chips thereof is described. A power-saving command associated with a first system chip is introduced to the computer system since a BIOS is modified therefore. The CPU of the computer system determines the power mode of the first system chip according to a register therein. As the first system chip enters the power-saving mode, the second system chip is informed entering the power-saving mode as well. Therefore, the peripheral devices coupled to the system chips can enter the power-saving mode smoothly so as to solve that the devices cannot enter the mode simultaneously since there is no power management unit (PMU) installed in the first system chip.

18 Claims, 4 Drawing Sheets

METHOD FOR TRANSMITTING A POWER-SAVING COMMAND BETWEEN A COMPUTER SYSTEM AND PERIPHERAL SYSTEM CHIPS

BACKGROUND OF THE INVENTION

1. Field of the Invention

A method for transmitting a power-saving command between a computer system and system chips thereof, a power-mode command is introduced into a first system chip for communicating with the computer system so as to drive the peripheral device into a power-saving mode.

2. Description of Related Art

The components and the peripherals of a computer system perform through the signal transmission via a bus transmitting the digital data with each other. The bus, such as a peripheral component interconnect (PCI) bus, accelerated graphics port (AGP) or the like, is used for transmitting data. The signal or data transmission between a central processing unit (CPU) and a North/South Bridge chip or the system memory is through a specific bus, thereby either do the plurality of peripherals or the components coupled to the bus.

Reference is made to FIG. 1 showing the conventional PCI bus 16 of a computer system is used to couple with a plurality of peripheral devices a, b, c. Under a low-power mode of the computer system, a PCI special cycle performs as the CPU 10 receives a low-power instruction via the PCI bus 16 controlled by the North or South Bridge chip 11, 12. After that, the peripheral devices a, b, c enter a predetermined state in the low-power mode controlled by a BIOS (basic I/O system) 15, or even to transmit the low-power instruction to the system memory 13 or graphic chip 14 via the specific bus.

U.S. Pat. No. 6,357,013 discloses a plurality of low-power instructions transmitted via the PCI bus in a computer system. In view of the conventional PCI bus, every peripheral coupled to PCI bus shares a 133 MB/sec bandwidth merely provided by a main channel for transmitting data to the South Bridge chip. Since the above-mentioned signal transmission via the PCI bus is set in timely order, if big data is under the transmission, the transmitting rate therefore will be slow down. For example, if a new-development serial ATA (SATA) device or a gigabit-level network device couples to the conventional PCI bus, the efficiency of the transmission thereof will be reduced due to the insufficient bandwidth.

Different from the current PCI standard using a multi-drop technology, a PCI-Express standard introduces a switch point-to-point transmission technology. The physical layer of the PCI-Express bus has a set of single-tasking lane composed of a transmit terminal and a receive terminal, moreover, each PCI-Express bus uses its own lane to communicate with the South Bridge chip independently. Since no more the common bus structure but independent lane used for the PCI-Express bus, the interference under the data transmission can be excluded. Furthermore, each data under the PCI-Express standard has the first privilege of the transmission, therefore the PCI-Express will be the first choice used in the computer system.

The PCI-Express standard defines a L2 and L3 power mode used for supplying power to the peripherals. Wherein, the L2 power mode indicates a main power and a reference clock are removed except for an auxiliary power, so the computer system enters a lowest power consuming condition and the system still can be woken up anytime. The L3 power mode indicates the main power and the reference clock are removed without the provision of the auxiliary power, the computer system will not be resumed until it reboots.

In the prior arts, a power-saving mode of the computer system is initialized after some steps for signal communication between the CPU and the South Bridge chip, the L2 and L3 power modes are defined. Then, an OS direct power management (OSPM) in the system initialize the peripheral devices ready into the power-saving mode. Meanwhile, an advanced configuration and power interface (ACPI) installed in the South Bridge chip will notify the PCI-Express peripheral devices that are ready into the power-saving mode. Otherwise, the prior arts never consider how to make the peripheral devices coupled with the North Bridge chip enter the power-saving mode via the PCI-Express bus smoothly.

SUMMARY OF THE INVENTION

Since the system chip (North Bridge chip) has no a power management unit (PMU) installed, the peripherals coupled with the North or South Bridge chip can not enter a power-saving mode simultaneously. Therefore, a method for transmitting a power-saving command between the computer system and the system chips is disclosed in the present invention. A BIOS code is modified to add the power-saving command for communicating with a first system chip, such as the North Bridge chip, thereby a register bit is used to determine the status of the first system chip. Therefore, since the peripheral device coupled with the first system chip enters the power-saving mode, and notifies the second system chip, such as the South Bridge chip, that its coupled peripheral device can enter the power-saving mode as well.

The method for transmitting the power-saving command comprises:

first, a CPU transmits a system command to a first system chip, and sets a first register in the first system chip, the first register can be a control register. The first system chip executes the system command afterward. In the meantime, the first system chip monitors a second register's state, and sets the second register after accomplishing the step for executing the system command. Then a second system chip responds the CPU after the CPU transmits the system command to the second system chip. The second system chip executes the system chip after receiving an acknowledgment signal sent from the CPU.

The preferred embodiment of the present invention illustrating the method for transmitting the power-saving command between the computer system and the system chips comprises:

In the beginning, the computer system determines a power mode. The CPU transmits a power-saving command to the first system chip after the determination. Simultaneously, a control register of the first system chip is set. After that, the first system chip drives its own coupled peripheral devices into the power-saving mode. At this moment, an I/O system monitors a state register, which is set after the first system accomplishes the power-saving command. That is, the CPU acknowledges the first system chip has done the command. And the CPU transmits the power-saving command to a second system chip, which responds the CPU after receiving the power-saving command sent from the CPU. The second system chip drives its coupled peripheral device into the power-saving mode after the CPU sends back the acknowledgment signal.

The aforementioned first system chip of the preferred embodiment of the present invention is the North Bridge chip, and the second system chip is the South Bridge chip, which has a PMU (power used to control power mode of the peripheral devices. Wherein an ACPI (advance configuration and power interface) installed in the South Bridge chip is used to switch off the communication port of the peripheral devices so as to enter the power-saving mode.

BRIEF DESCRIPTION OF THE DRAWINGS

The present invention will be readily understood by the following detailed description in conjunction accompanying drawings, in which.

DETAILED DESCRIPTION OF THE PREFERRED EMBODIMENTS

To allow the Examiner to understand the technology, means and functions adopted in the present invention further, reference is made to the following detailed description and attached drawings. The Examiner shall readily understand the invention deeply and concretely from the purpose, characteristics and specification of the present invention. Nevertheless, the present invention is not limited to the attached drawings and embodiments in following description.

Under a conventional PCI bus structure, the system chip of a computer system is not necessary to respond a power management signal to a CPU when the coupled peripheral devices thereto enter a power-saving mode via the PCI buds. Nevertheless, the system chip with a PCI-Express bus structure need to respond the power management signal to the CPU. When the system chip receives the power-saving command from the CPU and the I/O system thereof, the system chip need to respond an acknowledgment signal back to the CPU, and the peripheral device can enter the power-saving mode successfully. But the PCI-Express standard merely specify the peripheral devices coupled with the South Bridge chip have the mentioned responsive mechanism, the peripherals coupled with the North Bridge chip are excluded.

Furthermore, since the North Bridge chip has no a power management unit (PMU) installed, its coupled peripheral devices and the peripheral devices coupled with the South Bridge chip can not enter a power-saving mode simultaneously. Therefore, a method for transmitting a power-saving command between the computer system and the system chips is provided in the present invention, wherein a BIOS code of the computer system is modified for establishing a communication mechanism for communicating with a North Bridge chip. More particularly, a configurable power-saving command is introduced into the BIOS, wherein a register is used to determine the power status.

When the North Bridge chip enters the power-saving mode, the PMU of the South Bridge chip is notified and an ACPI (Advanced Configuration and Power Interface) within the South Bridge chip switches off the communication port of all its coupled peripheral devices. Accordingly, every peripheral devices coupled with the North or South Bridge chip can enter the same power-saving mode synchronously.

Figure 1:
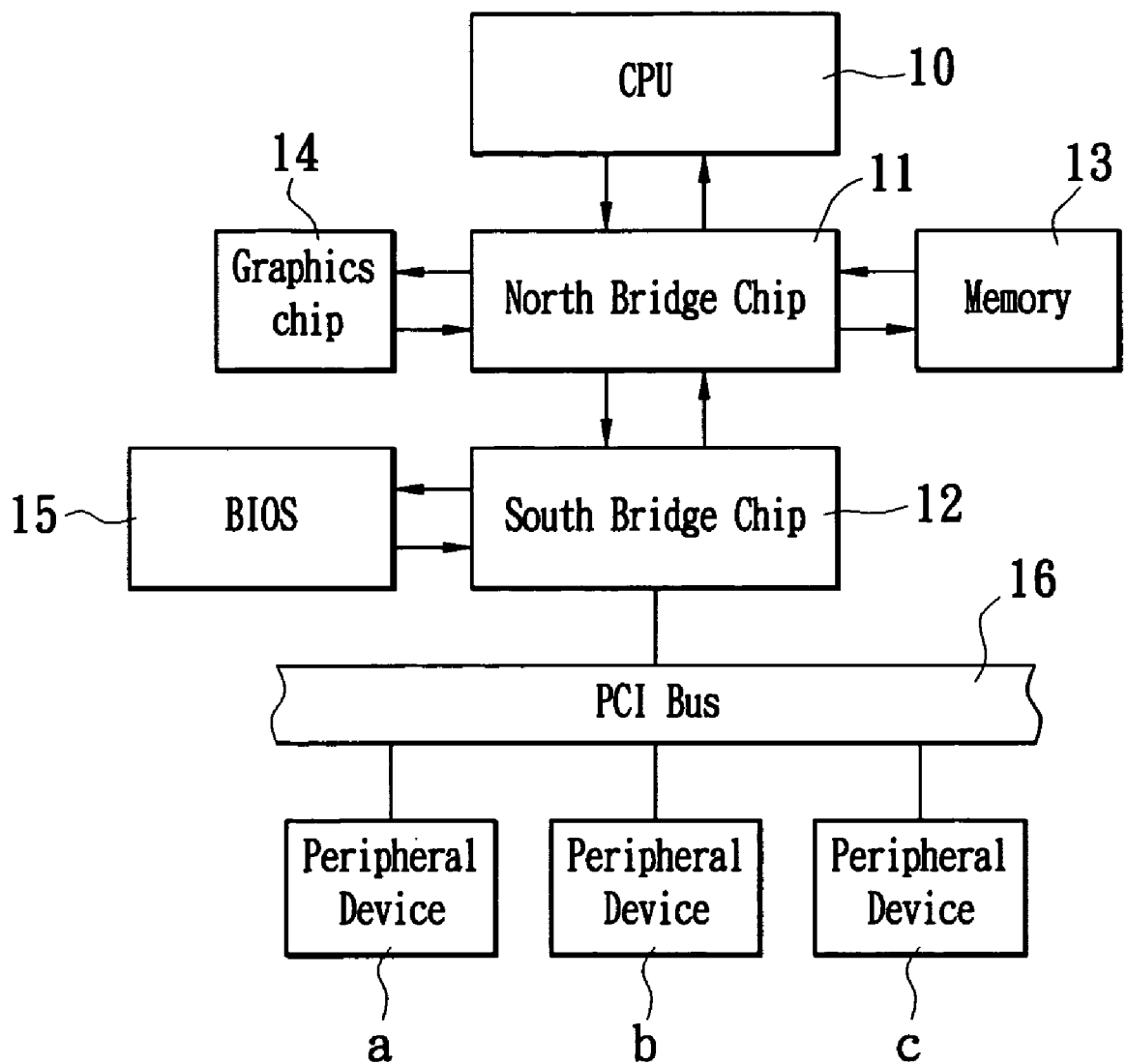
FIG. 1 shows a schematic diagram illustrating a conventional PCI bus used for a computer system of the prior art.
Figure 2:
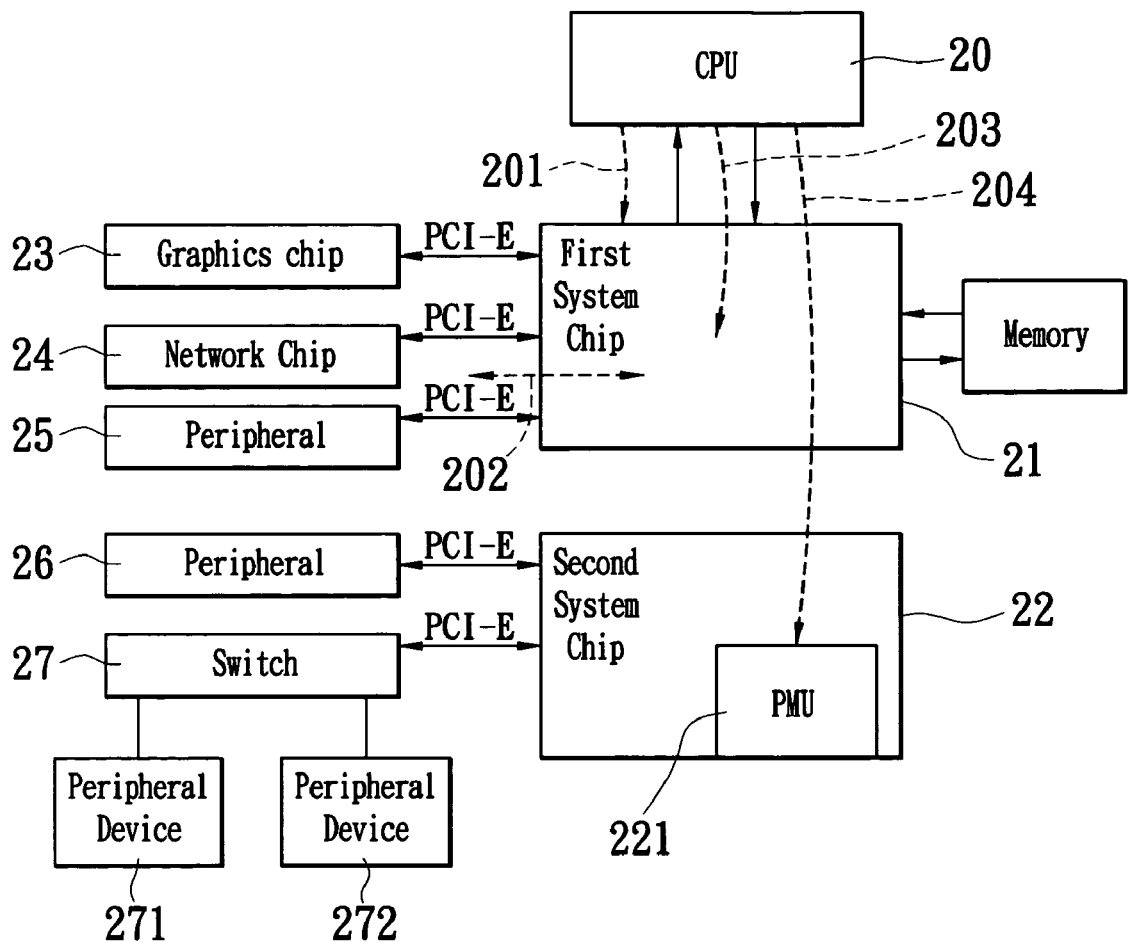
FIG. 2 shows a schematic diagram illustrating the signal transmission of the present invention.

FIG. 2 shows a schematic diagram of the signal transmission of the present invention. Wherein a first system chip 21 coupled with the CPU 20 is one of the system chipset, and a second system chip 22 is another one of the chipset couples to the first system chip 21. Each above-mentioned system chip couples to its proper peripheral devices via a PCI-Express bus. The first system chip 21 at least couples with a graphic chip 23, a network chip or the like, and moreover the second system chip 22 couples with a plurality of peripherals 271, 272,273 and other shown peripheral devices 26 via a switch of the PCI-Express bus.

Furthermore, a second register, which is provided for an I/O system coupled with the CPU 20, is set for establishing a communication mechanism to a first register of the first system chip 21. The CPU 20 transmits the system command to the first system chip so as to set the first register, thereby the second register is set after the first system chip 21 has executed the system command.

Wherein the first system chip of the preferred embodiment is the North Bridge chip, and the second system chip is the South Bridge chip, and the transmitted system command can be a power-saving command. More, the first register in the first system chip is a control register in a preferred embodiment, and the second register in the I/O system is a state register of the preferred embodiment.

As the preferred embodiment of the present invention is shown in FIG. 2. The CPU 20 transmits a first signal 201, which is a power management signal such as the power-saving command, to the first system chip 21. Meanwhile, the first register in the first system chip 21 is set, such as a bit 0 is flagged as a bit 1. Subsequently, the first system chip 21 transmits a second signal 202 to its coupled peripheral devices, such as the mentioned graphic chip 23, network chip 24 and other peripherals 25, via the PCI-Express bus. The second signal 202 having a control signal or an ACK (acknowledgment) signal is the power management signal used to drive the peripheral devices into the power-saving mode.

During the negotiating process using the transmission of the mentioned first signal and the second signal, the I/O system of the CPU 20 monitors the power status of the peripheral devices coupled with the first system chip at any moment. Such as a third signal 203 is used to monitor the second signal 202. When the peripheral devices coupled with the first system chip 21 enter the power-saving mode, the first system chip 21 will automatically set the second register therein. Through third signal 203, the I/O system monitors that the second register of the first system chip 21 has been set, which denotes the CPU 20 acknowledges that the first system chip 21 has entered the power-saving mode. After that, a fourth signal 204 shown in the diagram is used to notify the second system chip that its coupled peripheral devices can enter the power-saving mode. For example, the power-saving command is transmitted to a power management unit (PMU) 221 in the meantime, thereby the ACPI in the second system chip switches off the communication ports of the peripheral devices.

Figure 3:
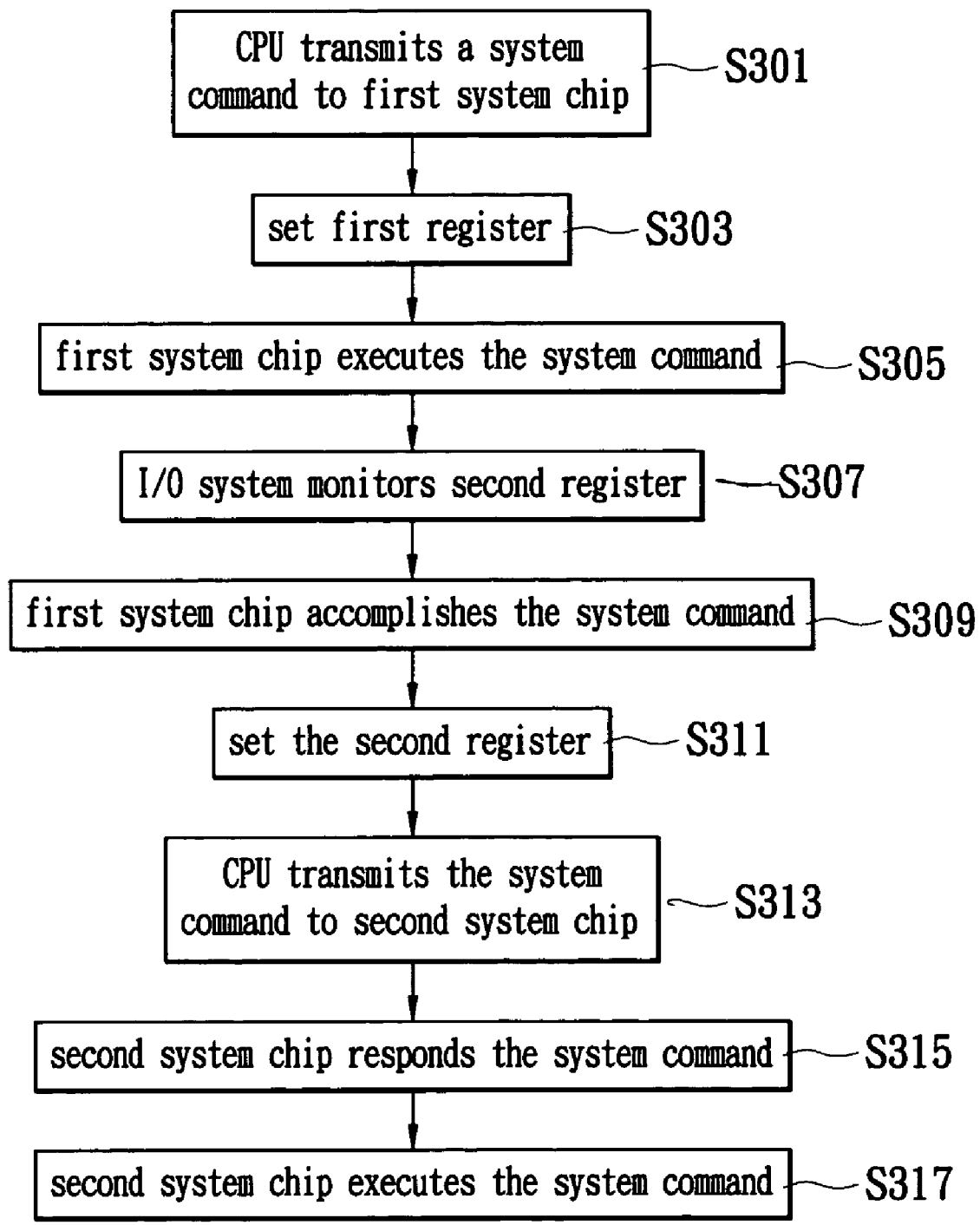
FIG. 3 illustrates a flowchart of the method for signal transmission of the present invention.

Reference is made to FIG. 3 illustrating a flowchart of the method for signal transmission of the present invention. The I/O system, such as a BIOS, of the computer system has a newly added state register, and modifies the related code with the system. Thereby the state register is used to determine the status of the first system chip.

The method for transmitting the system command is referring to FIG. 3.

First, the CPU transmits a system command to a first system chip, such as the North Bridge chip (step S301). That is, a first register in the first system chip is set, such as a bit 0 is flagged as a bit 1 or the bit 1 is flagged as bit 0 (step S303). The first system chip executes the system command afterward, like the step for driving the peripheral devices into the power-saving mode (step S305).

In the meantime, the first system chip monitors a second register's state, wherein the second register is a state register associating with the first system chip (step S307). When the first system chip has done the system command (step S309), the second register is set, such as the bit 0 is flagged as bit 1 (step S311). Accordingly, the I/O system can acknowledge the status of the first system chip by monitoring the mentioned register.

As the above disclosure, when the first system chip has executed the system command, then the CPU transmits the system command to the second system chip, such as the South Bridge chip (step S313). Afterward, the second system chip responds the CPU that the second system chip has received the command (step S315). After the CPU sends the acknowledgment signal back to the second system chip, the system command is executed to drive the peripheral devices coupled with the second system chip into the power-saving mode (step S317). Consequently, the first system chip and the second system chip can enter the power-saving mode through the method of signal transmission smoothly.

Figure 4:
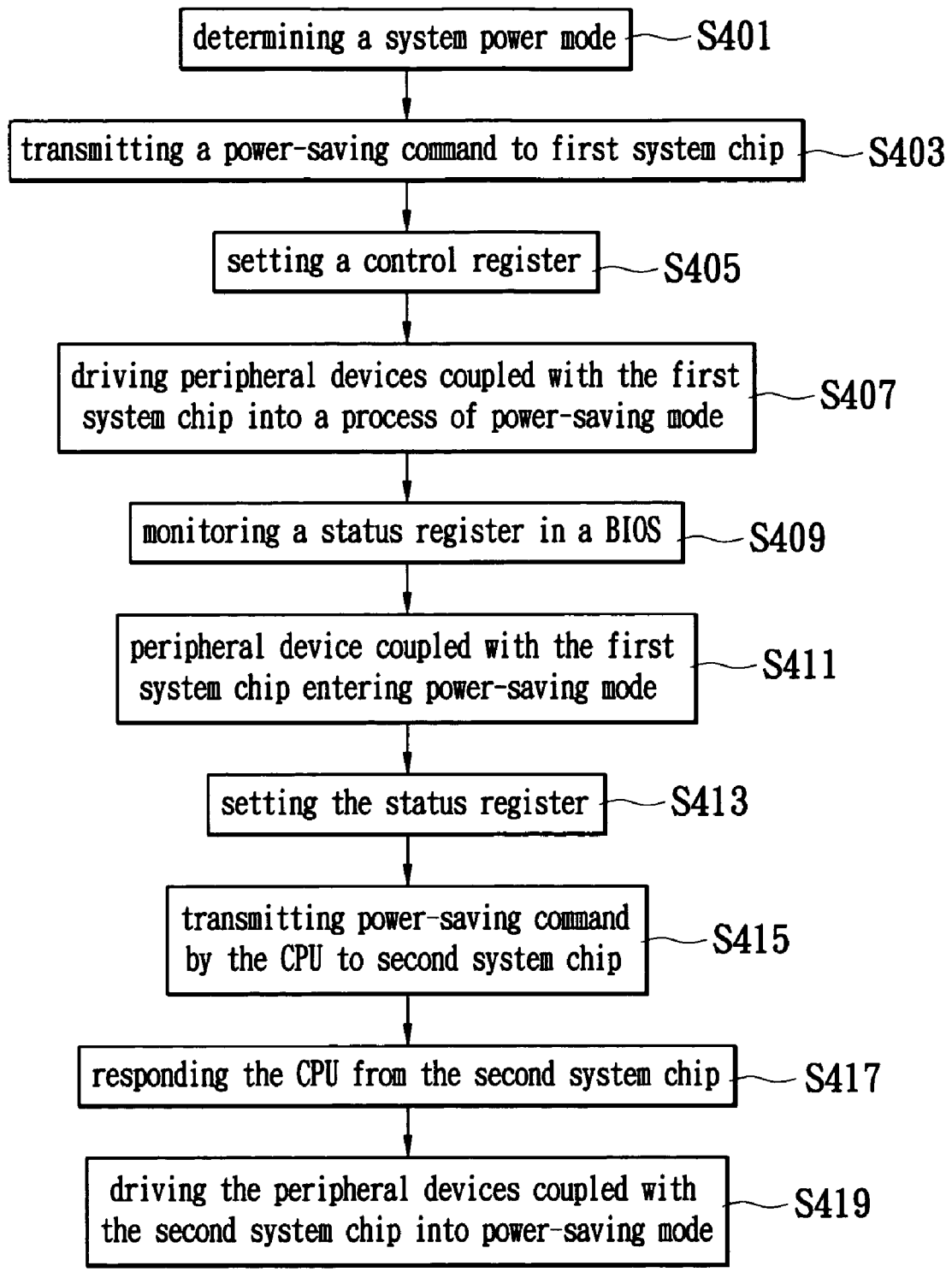
FIG. 4 shows a flowchart of the preferred embodiment of the method for transmitting a power-saving command of the present invention.

FIG. 4 shows a flowchart of the preferred embodiment of the method for transmitting a power-saving command between a computer system and system chips thereof.

Since the CPU of the computer system transmits the power-saving command to the peripheral devices via the PCI-Express bus, in the first instance, the peripherals coupled with the North Bridge chip are driven into the specific power mode, afterward, the peripherals coupled with the South Bridge chip are driven into the power mode as well.

In the beginning, the CPU of the computer system determines a power mode to be entered (step S401), wherein the power mode command transmission is performed by an operation system (OS) of the computer system or by a user. Further, the peripheral devices of the computer system can be driven into a plurality of power modes including an idle mode, a sleep mode, a shutdown mode, a step down mode and the like.

Next, the CPU transmits a power-saving command to the first system chip, such as the North Bridge chip, after the determination (step S403). Simultaneously, a control register of the first system chip is set, for example, a bit 0 is flagged as a bit 1 (step S405). After that, the first system chip is notified to drive its coupled peripheral devices proceeding to enter the power-saving mode (step S407). At this moment, the first system chip performs a negotiation process including controlling and responding processes with its peripheral devices so as to drive them into the power-saving mode.

Specially, a state register is introduced into an I/O system, the I/O system of the CPU monitors the state register, which is set after the first system has done the power-saving command (step S409). That is, the CPU can acknowledge whether the first system chip and its peripherals enter the power-saving mode by merely monitoring the state register.

If the peripheral devices coupled with the first system chip have not yet entered the power-saving mode, the state register is set as a default state, like a bit 0. If the peripheral devices coupled with the first system chip have entered the power-saving mode described in step S411, the state register is set, like the bit 0 is flagged as bit 1 (step S413).

And the CPU transmits the power-saving command to a second system chip, such as the South Bridge chip (step S415). The second system chip responds the CPU after receiving the sent power-saving command (step S417). The second system chip drives its coupled peripheral device into the power-saving mode after the CPU sends back the acknowledgment signal (step S419).

An ACPI (advance configuration and power interface) is used to switch off the communication port of the peripheral devices so as to drive them into the power-saving mode. Since the ACPI is specifically installed in the South Bridge chip rather than the North Bridge chip, the present invention discloses the method for transmitting the power-saving command between the computer system and system chips thereof, so all the coupled peripheral devices of the computer system can enter a specific power-saving mode successfully.

The many features and advantages of the present invention are apparent from the written description above and it is intended by the appended claims to cover all. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transmitting a power-saving command between a computer system and first and second system chips thereof, where a second register is defined in an input/output (I/O) system of the computer system, and a state of the first register is obtained by the second register to establish and execute the power saving command, the method comprising:
   transmitting the power saving command to the first system chip from a central processing unit (CPU);
   setting a first register in the first system chip;
   executing the power saving command and causing one or more first peripherals coupled to the first system chip to enter a power saving mode;
   monitoring a state of the second register, the second register being set in response to the one or more first peripherals entering the power saving mode;
   transmitting the power saving command to the second system chip from the central processing unit in response to the second register being set to a defined state; and
   in response to the power saving command, switching attached second peripherals to power saving mode.

2. The method of claim 1, wherein the first system chip is a North Bridge chip.

3. The method of claim 1, wherein the second system chip is a South Bridge chip.

4. The method of claim 1, wherein the system command is used to drive a peripheral device into a power-saving mode.

5. The method of claim 4, wherein an advance configuration and power interface in the second system chip responds to the power saving command by switching off a communication port of the peripheral devices so the peripheral devices enter the power-saving mode.

6. The method of claim 1, wherein the system command transmitted to the second system chip is transmitted to a power management unit of the second system chip.

7. The method of claim 1, wherein the I/O system is used to monitor the second register's state.

8. The method of claim 1, wherein the first register is a control register of the first system chip.

9. The method of claim 1, wherein the second register is a state register of the I/O system.

10. The method of claim 1, wherein the second system chip responds the CPU after the system command is transmitted to the second system chip, and the second system chip executes the system command as the CPU sends an acknowledgment signal to the second system chip response.

11. A method for transmitting a power-saving command between a computer system and first and second system chips thereof, where a second register is defined in an input/output (I/O) system of the computer system, by which a first and second system chip each having a plurality of peripheral devices coupled via a separate PCI-Express bus are controlled, the method comprising:

determining a power mode of the computer system;

transmitting a power-saving command to the first system chip from a central processing unit (CPU) utilizing the I/O system;

setting a first register of the first system chip in response to the power saving command;

driving the peripheral device coupled to the first system chip into the power-saving mode in response to the state of the first register;

resetting the first register to indicate the power saving command has been executed;

monitoring a state of the second register, the second register being set in response to the one or more first peripherals entering the power saving mode as established by the reset of the first register;

transmitting the power-saving command to the second system chip in response to the change in state of the second register; and driving the peripheral device coupled to the second system chip into the power-saving mode, in response to the power saving command.

12. The method of claim 11, wherein the first system chip is a North Bridge chip.

13. The method of claim 11, wherein the second system chip is a South Bridge chip.

14. The method of claim 11, wherein the system command transmitted to the second system chip is transmitted to a power management unit therein.

15. The method of claim 11, wherein an advance configuration and power interface (ACPI) installed in the second system chip is used to switch off a communication port of the peripheral devices so as to enter the power-saving mode.

16. The method of claim 11, wherein the I/O system is used to monitor the state register.

17. The method of claim 11, wherein the state register is set after the peripheral device coupled with the first system chip has been driven into the power-saving mode.

18. The method of claim 11, wherein the second system chip responds the CPU after the power-saving command is transmitted to the second system chip, and the peripheral device of the second system chip is driven into the power-saving mode as the CPU sends an acknowledgment signal to the response.

* * * * *